(12) United States Patent
Wobber et al.

(10) Patent No.: US 8,505,065 B2
(45) Date of Patent: Aug. 6, 2013

(54) ACCESS CONTROL POLICY IN A WEAKLY-COHERENT DISTRIBUTED COLLECTION

(75) Inventors: Edward P. Wobber, Menlo Park, CA (US); Martin Abadi, Palo Alto, CA (US); Thomas L. Rodeheffer, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1305 days.

(21) Appl. No.: 11/765,886

(22) Filed: Jun. 20, 2007

(65) Prior Publication Data

US 2008/0320299 A1 Dec. 25, 2008

(51) Int. Cl.
*G06F 17/00* (2006.01)
*H04L 29/06* (2006.01)

(52) U.S. Cl.
USPC .............................................. 726/1

(58) Field of Classification Search
USPC .............................................. 726/1
See application file for complete search history.

(56) References Cited

U.S. PATENT DOCUMENTS

| | | | |
|---|---|---|---|
| 4,432,057 A | 2/1984 | Daniell et al. | |
| 5,675,802 A | 10/1997 | Allen et al. | |
| 5,758,337 A | 5/1998 | Hammond | |
| 5,864,867 A | 1/1999 | Krusche et al. | |
| 5,870,759 A | 2/1999 | Bauer et al. | |
| 5,870,765 A | 2/1999 | Bauer et al. | |
| 5,873,096 A | 2/1999 | Lim et al. | |
| 5,926,816 A | 7/1999 | Bauer et al. | |
| 6,125,371 A | 9/2000 | Bohannon et al. | |
| 6,393,434 B1 | 5/2002 | Huang et al. | |
| 6,460,055 B1 | 10/2002 | Midgley et al. | |
| 6,539,381 B1 | 3/2003 | Prasad et al. | |
| 6,560,604 B1 | 5/2003 | Fascenda | |
| 6,574,617 B1 * | 6/2003 | Immerman et al. | 1/1 |
| 6,643,671 B2 | 11/2003 | Milillo et al. | |

(Continued)

FOREIGN PATENT DOCUMENTS

| | | |
|---|---|---|
| EP | 949821 A2 | 10/1999 |
| EP | 974895 | 1/2000 |

(Continued)

OTHER PUBLICATIONS

Notice of Allowance dated Dec. 10, 2009, in U.S. Appl. No. 11/771,153.

(Continued)

*Primary Examiner* — Carl Colin
*Assistant Examiner* — John Elmore
(74) *Attorney, Agent, or Firm* — Vierra Magen Marcus LLP

(57) ABSTRACT

A system is disclosed for creating and implementing an access control policy framework in a weakly coherent distributed collection. A collection manager may sign certificates forming equivalence classes of replicas that share a specific authority. The collection manager and/or certain privileged replicas may issue certificates that delegate authority for control of item policy and replica policy. Further certificates may be signed that create one or more items, set policy for these one or more items, and define a set of operations authorized on the one or more items. The certificates issued according to the present system for creating and implementing a control policy framework cannot be modified or simply overridden. Once a policy certificate is issued, it may only be revoked by the collection manager or by a replica having revocation authority.

10 Claims, 6 Drawing Sheets

U.S. PATENT DOCUMENTS

| | | | |
|---|---|---|---|
| 6,646,652 | B2 | 11/2003 | Card et al. |
| 6,711,575 | B1* | 3/2004 | Applewhite et al. ............... 1/1 |
| 6,751,659 | B1 | 6/2004 | Fenger et al. |
| 6,757,896 | B1 | 6/2004 | Cohen et al. |
| 6,779,019 | B1 | 8/2004 | Mousseau et al. |
| 6,839,711 | B1 | 1/2005 | Reddy et al. |
| 6,865,715 | B2 | 3/2005 | Uchino et al. |
| 6,910,052 | B2 | 6/2005 | Gates et al. |
| 6,970,876 | B2 | 11/2005 | Hotti et al. |
| 6,993,539 | B2 | 1/2006 | Federwisch et al. |
| 7,149,761 | B2 | 12/2006 | Cooke et al. |
| 7,321,904 | B2 | 1/2008 | Holenstein et al. |
| 7,421,457 | B2 | 9/2008 | Brodersen et al. |
| 7,444,337 | B2* | 10/2008 | Zhou et al. ........................ 1/1 |
| 7,483,923 | B2 | 1/2009 | Novik |
| 7,500,020 | B1 | 3/2009 | Kabra et al. |
| 7,506,007 | B2 | 3/2009 | Bjorner |
| 7,555,493 | B2 | 6/2009 | Khayter et al. |
| 7,680,819 | B1* | 3/2010 | Mellmer et al. ............. 707/783 |
| 2002/0147711 | A1 | 10/2002 | Hattori et al. |
| 2002/0156895 | A1* | 10/2002 | Brown ........................ 709/226 |
| 2003/0208459 | A1 | 11/2003 | Shea et al. |
| 2003/0227487 | A1 | 12/2003 | Hugh |
| 2004/0117667 | A1 | 6/2004 | Lavender et al. |
| 2004/0153473 | A1 | 8/2004 | Hutchinson et al. |
| 2004/0193952 | A1 | 9/2004 | Narayanan et al. |
| 2005/0015436 | A1 | 1/2005 | Singh et al. |
| 2005/0027755 | A1 | 2/2005 | Shah et al. |
| 2005/0027817 | A1 | 2/2005 | Novik et al. |
| 2005/0055698 | A1 | 3/2005 | Sasaki et al. |
| 2005/0086384 | A1* | 4/2005 | Ernst .............................. 709/248 |
| 2005/0102392 | A1 | 5/2005 | Bou-Ghannam et al. |
| 2005/0108200 | A1 | 5/2005 | Meik et al. |
| 2005/0125621 | A1 | 6/2005 | Shah |
| 2005/0223117 | A1 | 10/2005 | Terry et al. |
| 2005/0240640 | A1 | 10/2005 | Kaler et al. |
| 2005/0246389 | A1 | 11/2005 | Shah et al. |
| 2005/0273730 | A1 | 12/2005 | Card et al. |
| 2006/0020570 | A1 | 1/2006 | Wu |
| 2006/0089925 | A1 | 4/2006 | Kumar |
| 2006/0136570 | A1 | 6/2006 | Pandya |
| 2006/0190572 | A1 | 8/2006 | Novik et al. |
| 2006/0206768 | A1 | 9/2006 | Varghese |
| 2006/0215569 | A1 | 9/2006 | Khosravy et al. |
| 2006/0242443 | A1 | 10/2006 | Talius et al. |
| 2006/0288053 | A1 | 12/2006 | Holt et al. |
| 2007/0266031 | A1 | 11/2007 | Adams et al. |
| 2008/0120310 | A1 | 5/2008 | Khoury |
| 2009/0019054 | A1 | 1/2009 | Mace et al. |
| 2009/0327739 | A1* | 12/2009 | Relyea et al. ................. 713/182 |
| 2010/0050251 | A1* | 2/2010 | Speyer et al. .................... 726/20 |

FOREIGN PATENT DOCUMENTS

| | | |
|---|---|---|
| EP | 1288796 A2 | 3/2003 |
| JP | 2004318849 | 11/2004 |
| JP | 2006048345 A * | 2/2006 |
| WO | 9724669 | 7/1997 |

OTHER PUBLICATIONS

Final Office Action dated Dec. 1, 2009 in U.S. Appl. No. 11/751,478.
Final Office Action dated Jan. 22, 2010 in U.S. Appl. No. 11/771,273.
Haraldur D. Thorvaldsson, "Dynamic Evolution in a Survivable Application Infrastructure", 1982, pp. 1-7.
Karin Petersen, "Flexible Update Propagation for Ewakly Consistent Replication", 1997, pp. 288-301, ACM, New York, NY, USA.
Office Action dated Apr. 29, 2009 in U.S. Appl. No. 11/618,090.
Office Action dated Apr. 29, 2009 in U.S. Appl. No. 11/751,478.
Mike Dahlin, Data Synchronization for Distributed Simulations, European Simulation Interoperability Wrokshop, 2000, Austin, TX.
Thorsten Schutt, Efficient Synchronization of Replicated Data in Distributed Systems, Computational Science—ICCS 2003, 2003, pp. 662, vol. 2657/2003, Springer Berlin/Heidelberg.
Navendu Jain, TAPER: Tiered Approach for Eliminating Redundancy in Replica Synchronization, Proceedings of the 4th Conference on USENIX Conference on File and Storage Technologies San Francisco, CA, 2005, pp. 21, vol. 4, USENIX Association, Berkley, CA.
Sivaramakrishnan Narayanan, A Runtime Framework for Partial Replication and Its Application for On-Demand Data Exploration, Department of Biomedical Informatics, The Ohio State University, Columbus, OH.
Changqin Huang, Massive Data Oriented Replication Algorithms for Consistency Maintenance in Data Grids, ICCS 2006 Part 1, 2006, pp. 838-841, Springer-Verlag Berlin Heidelberg.
Nalini Belaramani, PRACTI Replication, Third Symposium on Networked Systems Design and Implementation, USENIX NSDI Proceedings, May 2006, pp. 59-72, San Jose, CA, USA.
Chang, "Bigtable: A Distributed Storage System for Structured Data", Operating Systems Design and Implementation Proceedings of the 7th Symposium on Operating Systems Design & Implementation, 2006, pp. 205-218, ACM Library.
Office Action dated Jul. 10, 2009 in U.S. Appl. No. 11/771,153.
Response to Office Action filed Jul. 29, 2009 in U.S. Appl. No. 11/751,478.
Office Action dated Aug. 5, 2009 in U.S. Appl. No. 11/771,273.
Response to Office Action filed Oct. 13, 2009 in U.S. Appl. No. 11/771,153.
Response to Office Action filed Nov. 5, 2009 in U.S. Appl. No. 11/771,273.
Office Action dated Oct. 1, 2010 in U.S. Appl. No. 11/771,273.
Response Final Office Action filed Apr. 4, 2012 in U.S. Appl. No. 11/751,478.
Office Action dated Feb. 28, 2012 in U.S. Appl. No. 11/771,273, filed Jun. 29, 2007.
Response to Office Action filed May 3, 2010 in U.S. Appl. No. 11/751,478.
Response to Office Action filed Jun. 28, 2012 in U.S. Appl. No. 11/771,273, filed Jun. 29, 2007.
Final Office Action dated Nov. 29, 2011 in U.S. Appl. No. 11/751,478.
Response to Office Action filed Feb. 1, 2011 in U.S. Appl. No. 11/771,273.
Response to Final Office Action filed Jun. 22, 2010 in U.S. Appl. No. 11/771,273.
Final Office Action mailed Apr. 8, 2011 in U.S. Appl. No. 11/771,273.
Office Action mailed Apr. 22, 2011 in U.S. Appl. No. 11/751,478.
Response to Office Action filed Oct. 5, 2011 in U.S. Appl. No. 11/771,273, filed Jun. 29, 2007.
Response to Office Action filed Sep. 22, 2011 in U.S. Appl. No. 11/751,478.

* cited by examiner

ACCESS CONTROL POLICY IN A WEAKLY-COHERENT DISTRIBUTED COLLECTION

BACKGROUND

In a collection of computing devices, a data item may be multiply replicated to create a number of copies of the item on the different computing devices and/or possibly within a single device. An item may be any stored data object, such as for example contact or calendar information, stored pictures or music files, software application programs, files or routines, etc. The collection of computing devices may for example be a desktop computer, a remote storage server, a personal digital assistant (PDA), a cellular telephone, etc. The group of all such items and replicas where the items are stored may be referred to as a distributed collection.

In many cases, a user would like all of their various data storing devices to have the latest updated information without having to manually input the same changes into each device data store. Replication, or synchronization, of data is one process used to ensure that each data store has the same information. Synchronization protocols are the means by which devices exchange created and updated versions of items in order to bring themselves into a mutually consistent state. The periodicity of the sync may vary greatly. Networked devices may sync with each other frequently, such as once every minute, hour, day, etc. Alternatively, devices may sync infrequently, such as for example where a portable computing device is remote and disconnected from a network for a longer period of time. Whether the synchronization is frequent or infrequent, the distributed collection is said to be weakly-coherent if, in any given instant, devices may have differing views of the collection of items because items updated at one device may not yet be known to other devices.

As an example, a user may maintain an electronic address book or a set of email messages in a variety of different devices or locations. The user may maintain the address book or email addresses, for example, on a desktop computer, on a laptop computer, on a PDA and/or on a mobile phone. The user may modify the contact information or send/receive email addresses using applications associated with each location. Regardless of where or how a change is made, one goal of replication is to ensure that a change made on a particular device or in a particular location is ultimately reflected in the data stores of the other devices and in the other locations.

FIG. 1 illustrates a weakly-coherent distributed collection, including multiple replicas 20 (one of which is labeled), designated A through F. Each replica A through F may be a computing device including a data store and associated processor. However, as is known, a single computing device may include several replicas, and a single replica may be implemented using more than one computing device. In the example of FIG. 1, the replicas may include a desktop computer A, a pair of laptop computers B and C, a cellular telephone D, a personal digital assistant (PDA) E and a digital camera F. The number and type of replicas is by way of example and may be more, less and/or different than shown. FIG. 1 further shows communication links 22 (one of which is labeled) between the various replicas to establish a peer-to-peer network.

Synchronization between replicas may be described as a sharing of knowledge between replicas. In particular, each replica 20 may create a new version of an item, either when it creates the first version of a new item, or when it updates an existing version of an item to create a new version of the item. A common knowledge sharing scheme involves tracking, within each replica, changes that have occurred to one or more items subsequent to a previous replication. One such tracking scheme makes use of version vectors, which consist of lists of version numbers, one per replica, where each version number is an increasing count of updates made to an item by a replica. During synchronization, one replica sends version vectors for all of its stored items to another replica, which uses these received version vectors to determine which updated items it is missing. Comparing the version vectors of two copies of an item tells whether one copy is more up-to-date (every version number in the up-to-date copy is greater than or equal to the corresponding version number in the other copy) or whether the two copies conflict (the version vectors are incomparable). The replica may then update its copy of the item if required or make efforts to resolve the detected conflict. Other knowledge sharing schemes are known. By repeating the synchronization process between replicas, all replicas eventually learn about the most up-to-date versions of each item.

Group policy is well known for coherent networks for setting desired configurations and access permissions at a single domain controller. These configurations and permissions may then be systematically applied to one or more groups of users and/or computers across a network. Group policy employs a collection of settings, referred to as group policy objects ("GPO"), that define what one or more computing devices will look like and how they will behave for one or more defined group of users. In addition to allowing disparate privileges to different user groups, group policy also allows software installations, updates and changes to be applied across an entire network of computers via a simple change to an existing GPO. This reduces the administrative burden and costs associated with managing these resources.

Group policy works in coherent networks in part because the creation and management of policy is logically centralized, for example in a central controller. When a new policy is created or updated, it is sent out to all nodes in the network simultaneously. When a computing device of the coherent network receives a new or updated policy, authenticated to be from the central controller, there is no question of its validity or whether it might be in conflict with another policy received from another source.

The same cannot be said of a weakly-coherent distributed collection. Such collections are by definition formed of autonomous, decentralized devices, in which replicas sync to each other sporadically and updates may occur in parallel. This can lead to conflicts which can have significant consequences when dealing with policy and security in a weakly replicated system.

For example, in prior art FIG. 1, laptops B and C, disconnected from each other, may update access control policy for an item or set of items without knowledge of the other's change. When another replica receives the changes, it may not be possible to resolve which policy to implement. As another example, replica A may update access control policy to remove rights of replica B to perform policy updates. Replica B could learn of this, but ignore it and instead create a policy update revoking replica A's right to perform policy updates. A replica rejoining the system may have no way of resolving the conflict. As a still further example, an access control policy may exist for the collection, possibly indicating that an item may not be updated. Under the framework with which conventional weakly-replicated systems operate, a replica may rewrite that policy and then update that item.

There is, therefore, a need of a framework for implementing an access control policy addressing the problems inherent in a weakly-coherent distributed collection.

SUMMARY

The present technology, roughly described, relates to a framework for implementing access control policy in a weakly-consistent distributed collection. The system includes a plurality of replicas capable of creating and/or updating versions of an item in a collection. A collection manager is additionally provided to ensure that only authorized replicas create or update versions in the collection. The collection manager is typically kept offline to prevent corruption of its private key. Accordingly, the collection manager may delegate the setting of certain access control policy operations to one or more replicas. These replicas may be authorized by statements (certificates) signed by a cryptographic key known only to the collection manager. Policy certificates can be signed with public-key cryptography, or with shared-key cryptography via a trusted third party. The discussion below assumes public key cryptography for exemplary purposes.

Embodiments of the access control policy framework of the present system may start by the collection manager signing certificates forming equivalence classes of replicas that share a specific authority. These classes may for example include privileged replicas which have been delegated the authority to create policy, modifier replicas which are able to create and/or update items, and synchronization replicas which are able to sync with other replicas. Once the equivalence classes are defined, the collection manager and/or privileged replicas may issue certificates that delegate authority for control of item policy and replica policy (equivalence classes are not required for issuing item or replica policy, but they make it convenient to represent equivalent policies that apply to multiple replicas). Thereafter, certificates may be signed that create one or more items, set policy for these one or more items, and define a set of operations authorized on the one or more items. These operations may include how specific items are to be updated and synchronized.

The certificates issued according to the present system for creating and implementing a control policy framework cannot be modified or simply overridden. Once a policy certificate is issued, it may only be revoked by the collection manager or by a replica having revocation authority. In this way, the present system avoids the problems inherent in prior art access control policy for weakly-coherent distributed collections of conflicting policy and arbitrarily non-compliant replicas.

DETAILED DESCRIPTION

The present system will now be described with reference to FIGS. 2-6, which in general relate to a framework for implementing access control policy in a weakly-consistent distributed collection. The system may be implemented on a distributed computing environment, including for example one or more desktop personal computers, laptops, handheld computers, PDAs, cellular telephones, multiprocessor systems, microprocessor-based systems, programmable consumer electronics, minicomputers, and/or other such computing system environments. Details relating to one such computing system environment are explained hereinafter with respect to FIG. 6. Two or more of the computing system environments may be continuously and/or intermittently connected to each other via a network such as peer-to-peer or other type of network as is known in the art.

Figure 1:
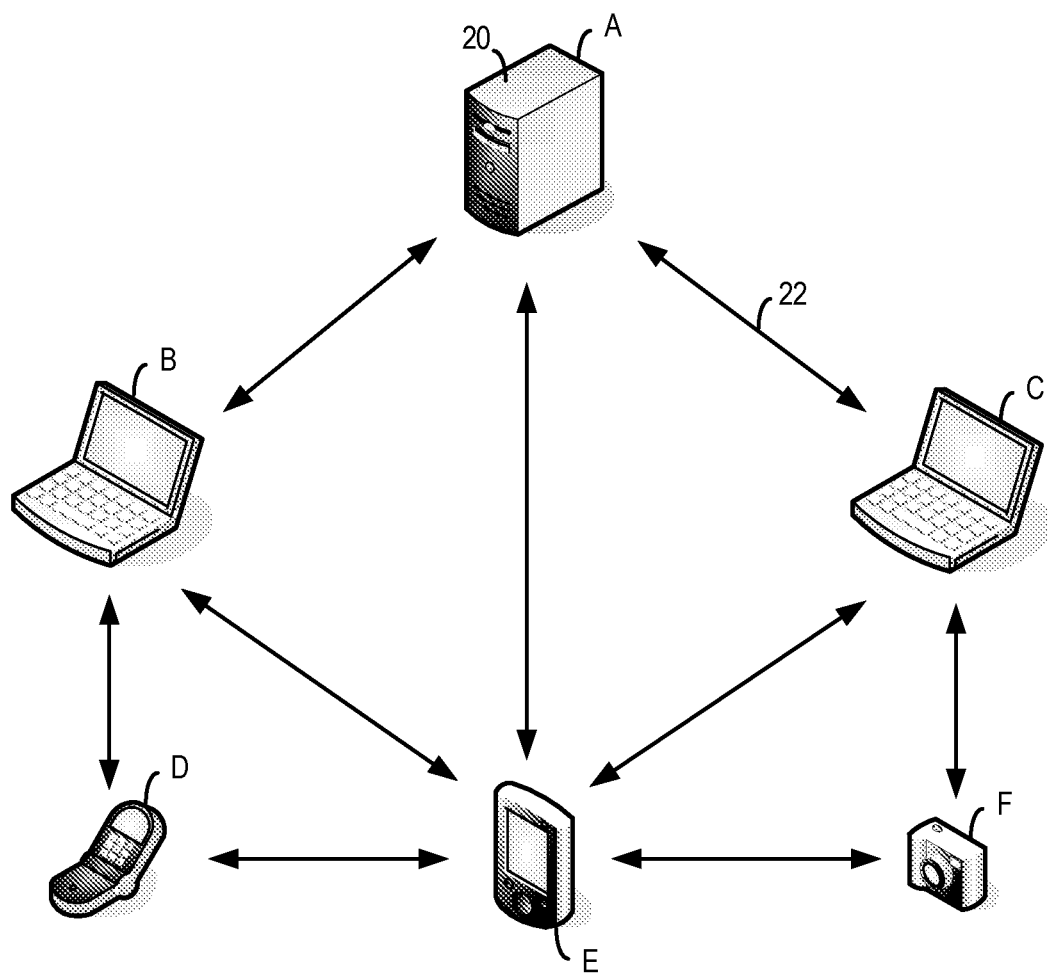
FIG. 1 is weakly-consistent distributed collection according to the prior art.
Figure 2:
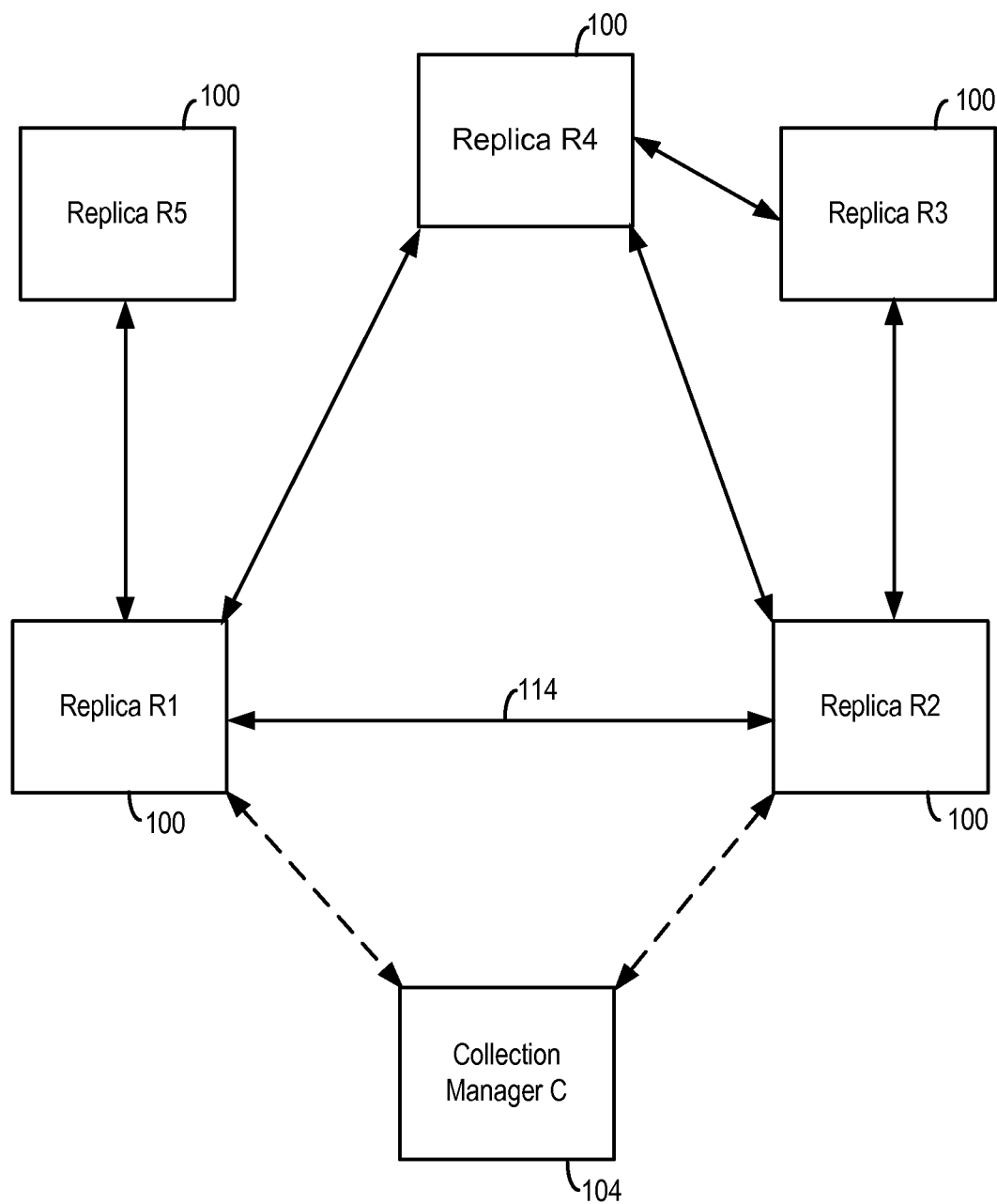
FIG. 2 is weakly-consistent distributed collection according to an embodiment of the present system.
Figure 3:
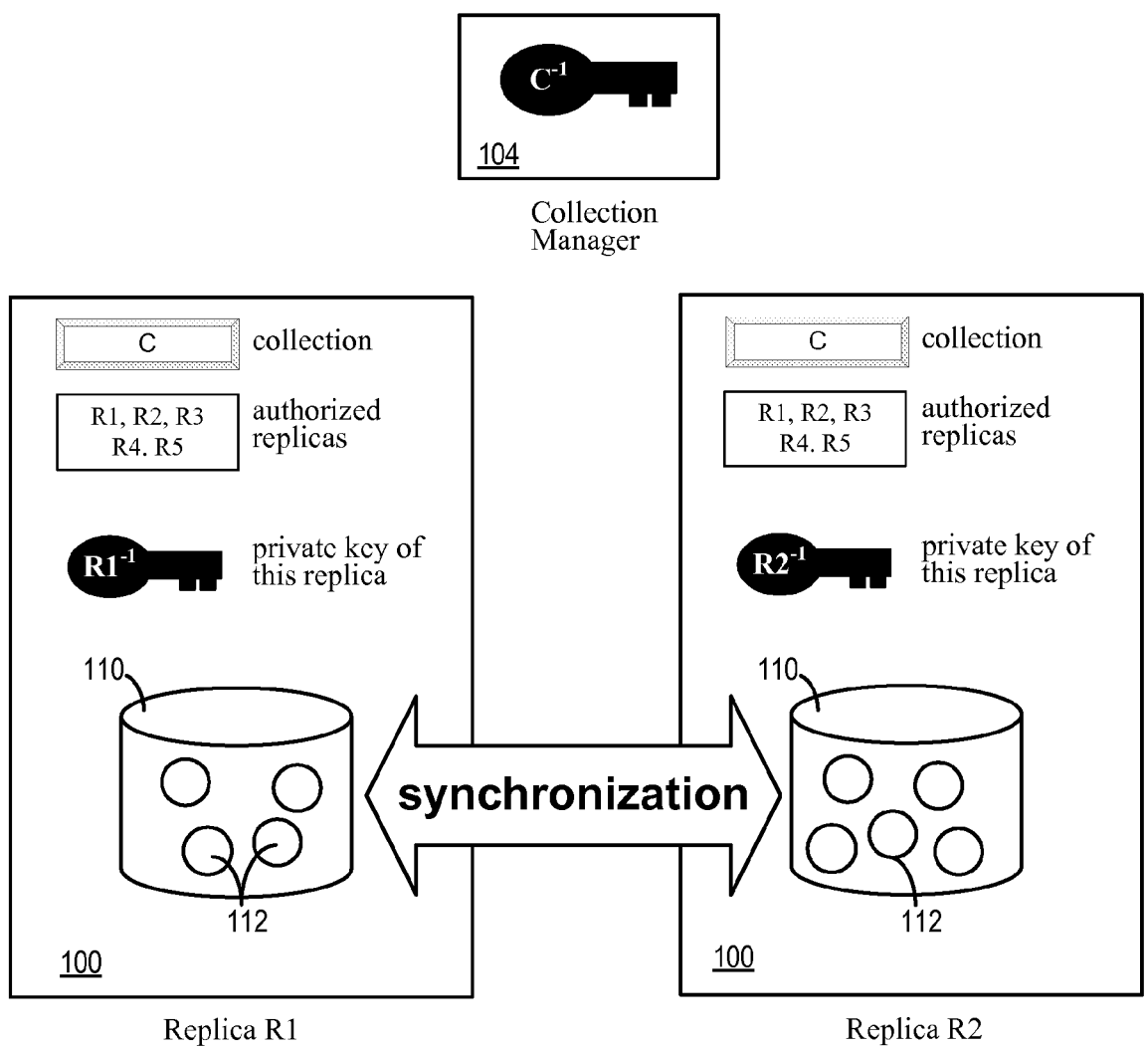
FIG. 3 is a block diagram of a pair of replicas and the collection manager from the weakly-consistent distributed collection of FIG. 2.

Referring initially to FIGS. 2 and 3, the system includes a plurality of replicas 100, arbitrarily referred to herein as replicas R1 through R5. Except for a specialized policy item explained hereinafter, each replica 100 has the ability to influence (i.e., create and/or modify) a version of an item in a collection. Each influenced version may have an associated influence list, which may be a version vector, from which a replica may determine the history of influencing replicas, whether a given version supersedes another version or whether a given version is in conflict with another version.

A replica may be a computing system environment. However, as explained hereinafter, each replica may be designated by a public-private key pair. Multiple replicas may exist on a single computing system environment, and a single replica may exist across multiple computing system environments. As indicated in FIG. 3, each replica 100 may include a data store 110 associated with a processor on one or more computing system environments mentioned above or as known in the art. The processor can place versions of items 112 into data store 110 and can expunge versions 112 from data store 110. The number of replicas comprising the collection shown in the figures is by way of example and there may be greater or fewer replicas in the collection than is shown.

As is known in the art, the replicas may communicate with each other in an ad hoc, peer-to-peer network via communication links 114 (one of which is labeled in FIG. 2) between the various replicas. The communication link between respective replicas can be wired and/or wireless, and may be the Internet, a LAN, a WLAN or any of a variety of other networks.

It may be that not all replicas are linked to all other replicas. For example, replica R5 is linked to replica R1, but not replica R4. Consequently, replicas R4 and R5 can share knowledge only through replica R1 (and possibly one or more additional intervening replicas). When a version is created or updated by a replica, the sync process propagates that version across all replicas over time. Thus, over time, each replica will contain the most current version of an item. Where two versions are in conflict with each other, both conflicting versions will exist on the replicas until resolved.

The system needs safeguards in place to ensure that only authorized replicas can create or update items in the collection, and that only authorized replicas can create or revoke access control policy as explained hereinafter. The collection manager 104 is provided for the purpose of authorizing replicas and issuing access control policy. As explained hereinafter, some of this responsibility may be delegated by the collection manager to one or more replicas in the collection.

In embodiments, the collection manager 104 may be a computing system environment capable of issuing policy statements, or certificates, during the normal operation of the system. Other and/or additional protocols, such as those using shared key cryptography are contemplated. In embodiments, the collection manager 104 may be a replica, or operate in association with a particular replica. The collection manager may be completely or primarily offline (as indicated by the dashed lines in FIG. 2). For example, the collection manager may be represented by a public key stored on a portable storage device kept in a physical safe. In this case, the portable storage device would be brought out to sign certificates when necessary, but otherwise kept offline to avoid compromise. It is contemplated that the collection manager 104 may be part of the synched network of the collection in alternative embodiments.

Figure 4:
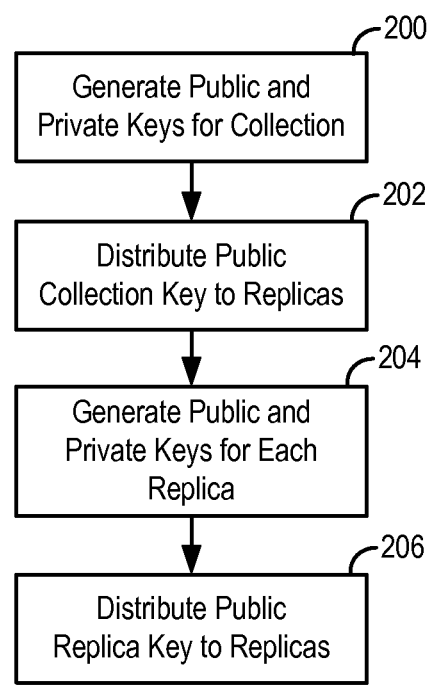
FIG. 4 is a flowchart of the operation and interaction of the collection manager and replicas to implement an access control policy according to an embodiment of the present system.

Referring now to FIG. 3 and the flowchart of FIG. 4, where the collection manager 104 operates using public key cryptography, a public and private key pair, arbitrarily referred to herein as C and $C^{-1}$, is generated for or by the collection manager in step 200. The collection public and private key pair is used to authorize all replicas in the collection. The collection manager 104 stores the private key $C^{-1}$, and distributes the public key C to all replicas within the collection in step 202. Replicas are authorized by certificates signed by the private key $C^{-1}$. As explained hereinafter, the authorization certificates signed by the collection manager define the access control policy of the collection. Authorization policy certificates can be signed with public-key cryptography, or with shared-key cryptography via a trusted third party.

In embodiments, replica public and private key pairs are generated for or by each replica 100 in step 204. Each replica in the collection may be given its own private key and is identified by its own public key which is distributed to the collection in step 206. Each replica maintains its corresponding private key. Thus, each replica knows the public key of the collection and the public keys of all authorized replicas. Each replica also knows its own private key. The process of determining that a replica public key should be authorized (e.g., that it speaks for the replica) is not addressed by this invention.

As indicated above, access control policy for the collection may be defined by the collection manager. However, as the collection manager may be off-line much, if not all, of the time, the collection manager may delegate the ability to create policy to one or more replicas in the collection. Once an access control policy is defined by policy certificates signed by the collection manager, these policy certificates defining rights cannot be modified or simply overridden. In embodiments, policy certificates may be revoked by the collection manager or by a replica having revocation authority. Moreover, policy certificates may "time-out" after a predetermined period of time. In this way, the present system avoids the problems inherent in prior art access control policy for weakly-coherent distributed collections of conflicting policy and arbitrarily non-compliant replicas.

The framework of the present system for implementing an access control policy in a weakly-coherent distributed collection may in general operate by the following operations:

- forming equivalence classes of replicas that share a specific authority;
- delegating authority for control of item and replica policy;
- establishing access control rules that apply to replicas as a whole;
- defining default policy for items in a collection; and
- performing per-item access control during synchronization.

Each of these operations of the access control policy framework is explained in greater detail below.

Equivalence classes of replicas may be formed by the collection manager by certificates signed by the private key $C^{-1}$ as part of step 200 described above with respect to FIG. 4. In accordance with the present system, different classes of replicas may be defined, with each class having different rights. The rights of the different classes may be mutually exclusive of each other, or they may be defined to be at least partially inclusive of other classes.

In an embodiment, there may be three such equivalence classes: a privileged class of replicas which can set policy, a modifier class of replicas which can create and update items, and a synchronization class of replicas which can sync with other replicas but not update items. Each of these classes is explained in greater detail below. It is understood that there may be more or less than three classes in further embodiments. Moreover, in embodiments of the present system, there may be classes defined for each type of item. For example, as explained below, policy statements may be provided defining operations on an entire group of items, or alternatively, only on a subset of items ("foo" items). In embodiments, a choice of equivalence classes may be provided for a complete set of items and for a subset of foo items.

Referring initially to the privileged class of replicas, the collection manager has the ability to set access control policy for replicas and items in the collection. However, as the collection manager may generally or always be offline, the collection manager in embodiments may delegate authority to set access control policy for replicas and/or items to one or more replicas, referred to herein as privileged replicas. The classification of one or more replicas within the privileged class is created by a certificate signed by the private key of the collection manager. It is understood that a wide variety of rights may be delegated from the collection manager to replicas in the privileged class. In embodiments, these delegated rights may be any operations the collection manager may perform.

Once defined in the privileged class, a replica has the ability to set policy by modifying permissions stored within an access control list, or ACL, within the devices of the respective replicas. As one example, the collection manager may create a privileged replica which has the ability to classify other replicas in one or more of the equivalence classes. Thus, a privileged replica may be delegated the authority to create other privileged replicas, it may be delegated the authority to create modifier replicas which can create and update items, and it may be delegated the authority to create synchronization replicas which can sync with other replicas. Other delegated rights are contemplated. While the collection manager may delegate any of its policy making responsibilities, in embodiments, the collection manager does not delegate all of its responsibilities.

Referring now to modifier replicas, such replicas may be created by a policy certificate signed by the collection manager, or by a policy certificate signed by a privileged replica having such delegated authority. Replicas created in this class have the ability to modify the contents of an item by creating a new item and/or updating an existing item in the collection. It is noteworthy that, in embodiments, replicas created in the modifier class may also create access rights policy, as long as to do so would not conflict with a policy rule implemented by the collection manager or class of privileged replicas. In further embodiments, a replica defined by certificate to be a modifier replica does not have the ability to define access rights policy.

Referring now to synchronization replicas, such replicas may be created by a policy certificate signed by the collection manager, or by a policy certificate signed by a privileged replica having such delegated authority. Replicas created in this class have the ability to read items from a source replica during a synchronization operation. In embodiments, replicas in this class do not have the ability to create/update items and do not have the ability to set policy.

An example of the formation of equivalence classes, as well as the remaining components of the access control policy framework according to the present system, is set forth below. In this example, the framework may be expressed in terms of "speaks for" logic. The "speaks for" logic is described for example in a publication by Lampson, B., Abadi, B., Burrows, M., and Wobber, E., "Authentication in distributed systems: Theory and practice," *ACM Transactions on Computer Systems*, 10(4):265-310, 1992, which publication is incorporated by reference herein in its entirety. A related publication by Wobber, E., Abadi, M., Burrows, M., and Lampson, B., "Authentication in the Taos operating system," *ACM Transactions on Computer Systems*, 12(1):3-32, 1994 is also incorporated by reference herein it its entirety.

In general, these publications describe a logic where the construct:

$$A => B$$

indicates that A speaks for B, meaning that if A makes a statement then B makes it too:

$$\text{if } (A=>B) \text{ and } (A \text{ says } S) \text{ then } (B \text{ says } S).$$

The "=>" relation is a partial order; that is, it is reflexive, antisymmetric, and transitive. It obeys many of the same laws as implication, so the same symbol as implication may be used.

It may be desired to speak for a restricted subset of what B can say. To denote this, the following construct:

$$\text{if } (A=>[foo]B) \text{ and } (A \text{ says } S) \text{ then } (B \text{ says } S)$$

may be used for all statements S that constitute operations on objects with the name prefix "foo". This means that A speaks for B, but only for the subset of operations characterized by the restriction noted in the brackets. In this example, A and B may want to invoke operations on objects whose names include the prefix "foo," and that A and B agree about the meaning of "foo".

Using "speaks for" logic, an example of a group of equivalence classes of replicas may be defined as described above. In the following description, C is the collection manager:

| | |
|---|---|
| C says R1=>PrivilegedReps | (i) |
| C says R2=>PrivilegedReps | (ii) |
| C says PrivilegedReps=>ModifierReps | (iii) |
| C says R3=>ModifierReps | (iv) |
| C says R4=>SyncReps | (v) |
| C says ModifierReps=>SyncReps | (vi) |

The above statements (i)-(vi) are logic statements that correspond to certificates signed by the private key of the collection manager. Statement (i), for example, says that the public key for the new replica R1 speaks for some group of privileged replicas. This is the same as saying that R1 is a member of this group. Statements (ii)-(vi) similarly say that some new replica or group speaks for some other group of replicas.

The present system creates members in a group by a set of certificates, which propagate and come together to form the logical membership of the group. The collection manager is not the only entity that can make statements. If the collection manager delegates authority and says that some other replica can admit new members as, for example, privileged members, that replica then has the authority to make other replicas privileged members.

In the example of statements (i)-(vi), the defined policy is that "PrivilegedReps" is the privileged class of replicas having authority to control access lists on objects in C; "ModifierReps" is the modifier class of replicas having authority to control contents of objects in C; and "SyncReps" is the synchronization class of replicas having authority to act as synchronization targets. These names are by example only and may be different in alternative embodiments. Additionally, there are many different sorts of access control equivalence classes that can be constructed in this way. As indicated above, in embodiments of the present system, there may be equivalence classes defined covering all items, and there may be equivalence classes defined for each type of item.

The next component of the access control policy framework involves delegating authority for control of item policy and replica policy. As described above, the collection manager may sign certificates granting privileged replicas the ability to delegate authority for the control of other replicas and items. Continuing with the above example, this may be done in part by assigning a namespace of items that the collection manager C controls, and delegating restricted authority of C to the replicas that are empowered to create items in pre-defined subsets of that namespace:

| | |
|---|---|
| C says R1=>[r1]C | (vii) |
| C says R2=>[r2]C | (viii) |
| C says R3=>[r3]C | (ix) |

What these statements mean, for example with reference to (vii), is that if replica R1 says S, where S is an operation on an item with the namespace prefix r1, then C says it too. Stated differently, R1 can say anything that C can say over things which live in the namespace prefixed by r1. Thus, the collection manager can give R1, and only R1, the right to perform operations related to the r1 part of the namespace. If so, other replicas R2, R3, etc., do not have the ability to perform operations on r1 (unless expressly granted by the collection manager or R1 in further policy statements).

According to embodiments of the system, one or more items may next be created in C, policy may be set for these one or more items, and a set of operations may be defined on the one or more items. These operations may include how specific items are to be updated (if at all) and synchronized. In the example, updates are referred to as "SetContents" operations, and synchronization of an item to a target replica is referred to as "Read" operations by a target replica. Statements of the following form accompany items in C.

| | |
|---|---|
| R1 says PrivilegedReps=>[r1/id]R1 | (1) |
| R2 says ModifierReps=>[r1/id/SetContents(*)]R2 | (2) |
| R2 says SyncReps=>[r1/id/Read( )]R2 | (3) |
| R3 says r1/id/SetContents(val) | (4) |

In statement (1), r1/id is an item created by replica R1. The statement says that the group PrivilegedReps (of which replica R1 is a member) has delegated authority over all operations on the item r1/id, where "id" is a unique identifier, such as a GUID, for the newly created item. Statement (1) says that PrivilegedReps have authority over the item r1/id. PrivilegedReps can thus change access control policy for that item.

Statements (2) and (3) are ACLs for the SetContents and Read operations. Members of PrivilegedReps have authority to set these ACLs. In statement (2), replica R2 (another member of PrivilegedReps) says that members of ModifierReps can set the contents of item r1/id. In statement (3), replica R2 is further saying that members of SyncReps can read the contents of item r1/id. Statement (4) represents an update to r1/id by R3. R3 is a member of ModifierReps and authorized to invoke SetContents, but not PrivilegedReps and cannot control its ACLs. In statement (4), replica R3 is authorized to set the contents of item r1/id.

If R1 creates an item and an access control policy statement associated with the item, then no other replica can make new versions of that item elsewhere in the collection (unless granted that permission in a statement from R1). The fact that the name prefix r1 appears in (1) ensures that no replica that is not a member of PrivilegedReps can assume control of the item named by "id". For example, if r1 did not appear in (1), then replica R3 may be able to write a certificate claiming the right to make ACLs on id. R3 cannot do this for r1/id, because, under statement (1), R3 has no authority on r1.

Statements (1)-(4) define per-item policy. However, it is not necessary to define policy on a per-item basis. It is understood that logical statements of the following form are possible:

R2 says *=>[r1/id/Read( )]R2.

In other words, replica R2 sets up that any replica in the collection can be a sync target for this item. This will be needed in any case where the set of potential replicas is unbounded or is not known a priori. Additional description of default policy is described in greater detail below.

In evaluating statements (1), (2), and (3), any reference monitor trusts that C has complete authority on everything in C. What follows is an informal proof that any reference monitor must make in order to permit or deny an operation on an item.

Conjoining statements (4) and (iv):
 ModifierReps says r1/id/SetContents(val)
Considering statement (2) provides:
 R2 says r1/id/SetContents(val)
Conjoining with statement (ii):
 PrivilegedReps says r1/id/SetContents(val)
Considering statement (1) produces:
 R1 says r1/id/SetContents(val)
Finally, incorporating statement (vii), it can be inferred that:
 C says r1/id/SetContents(val)
QED and thus the action is allowed.

Each of statements (i)-(ix) and statements (1)-(4) above are examples of policy statements created by a certificate signed by the collection manager or by a replica to which such signing authority has been delegated. These policy statements cannot be modified or simply overridden. In order to change a policy created by a policy statement, the statement must be revoked by the collection manager or by a replica to which such revocation authority has been delegated. In this manner, the conflicts and arbitrary non-compliance of replicas with established policy seen in prior art weakly-replicated systems is avoided. Policy may also change by time-outs.

Figure 5:
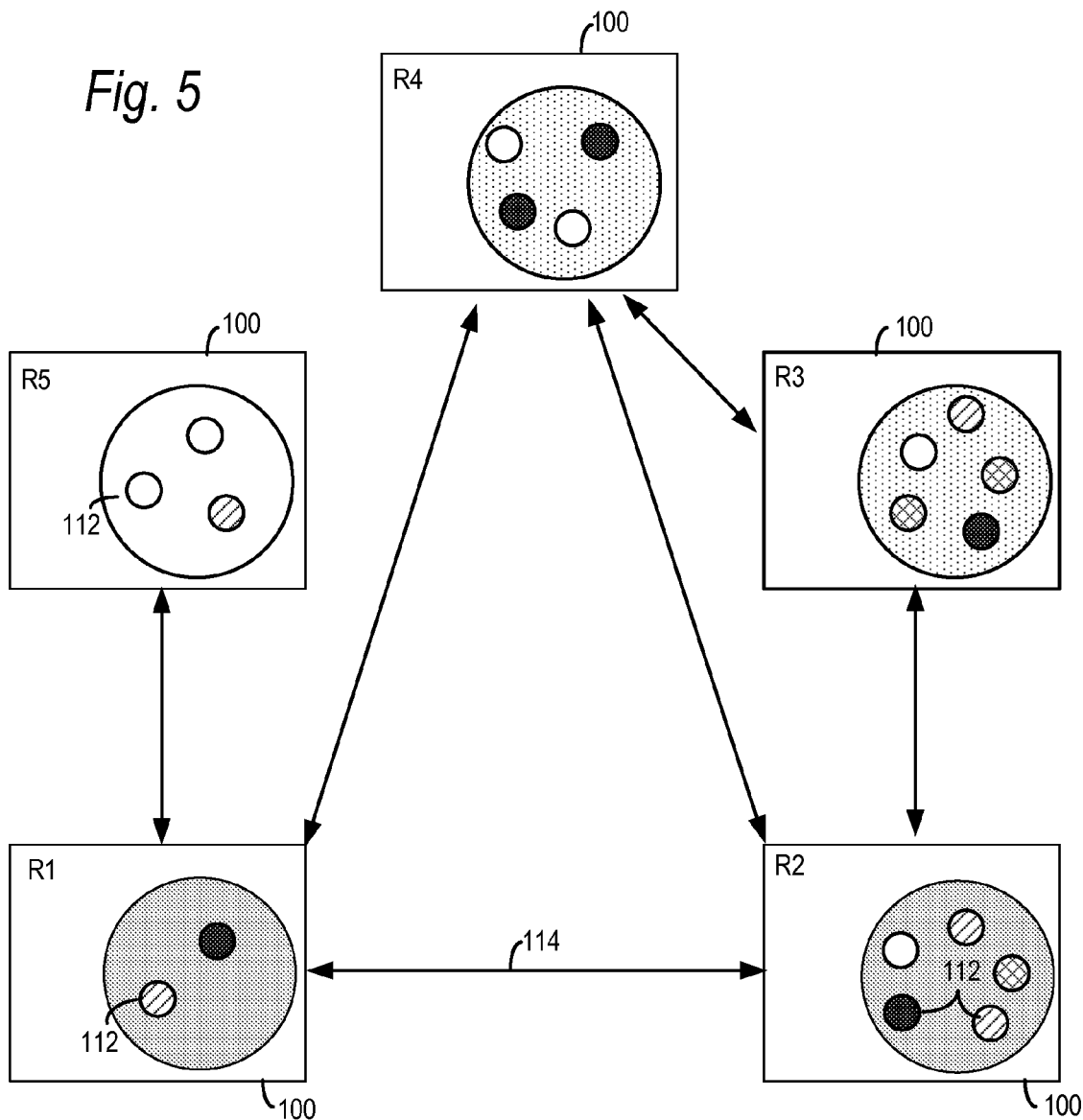
FIG. 5 is weakly-consistent distributed collection according to an embodiment of the present system illustrating an access control policy implemented on replicas and items in the collection.

FIG. 5 is a sample collection including illustrated replicas and items created by the access control policy framework according to the present system. The collection manager has signed certificates creating a pair of privileged replicas R1 and R2, a pair of modifier replicas R3 and R4 and a synchronization replica R5. In alternative embodiments, the policy for one or more of these replicas may be created by a privileged replica which has been delegated such rights.

FIG. 5 further shows a plurality of items 112 (some of which are labeled in FIG. 5). The legend at the bottom of FIG. 5 shows that some of the items may be modified only by replica R1 under the access control policy. Other items may only be modified by replicas R1 and R2 under the access control policy. These items may be synched across the collection, but may only be updated by their designated replicas.

Other items 112 may be read only by replicas R2 and R3 under the access control policy. This policy may have been issued by replica R1, setting a policy which prevents replica R1 from reading these objects. Other items may have a default policy assigned to them, as explained hereinafter, allowing them to be read and/or updated by any replica in the collection. It is understood that the access control policy illustrated in the collection of FIG. 5 is by way of example only and any number of differently configured policies may be created according to the present system.

In practice, statements such as (i)-(ix) set forth above are considered to be collection policy. These will take the form of certificates distributed along with the collection. That is, these specialized policy items will sync between replicas and be distributed in a manner similar to other statements. As indicated below, one difference is that these specialized policy items will be received first during a sync operation and acted on prior to receiving other items during a sync operation. Statements (vii)-(ix) might be inferred as static policy rather than embodied as certificates. In general, collection policy will be contained and propagated within a specially-labeled items that are uniquely identified within a collection and that are protected with a special access control policy (e.g., it should be writable only by the collection root key or by a protected replica). In embodiments, there may be one such item per replica, to hold the statements signed by that replica (here, the collection manager may also be thought of as a replica).

The specialized policy items should always propagate first in any synchronization action, since updates to the collection policy might affect the perceived validity of later updates. Updates to collection policy propagate lazily. Hence, there can be policy inconsistencies across replicas. However, if policy updates always propagate first, it should never be the case that an update can arrive before the collection policy needed to determine its validity.

Statements (1)-(4) are embodied as public-key certificates and/or content signatures. Except as discussed below under default collection policy, each of these statements must exist for all items.

Referring now to timeouts and revocation of policy statements, the certificates that populate collection policy are subject to long-term timeouts and must be refreshed occasionally. Per-item certificates and signatures are not normally subject to timeout. Other than timeout, revocation is another means for disallowing a logic statement set forth above. In one embodiment, every certificate possesses a unique identifier that can be invalidated by a trusted source. In practice, only collection policy elements may be revoked. Thus, once an item ACL allows access, access cannot be revoked except through a revocation of system policy. Accordingly, the problem of conflicting and overwriting of policy found in conventional weakly-replicated systems is avoided.

In order to handle revocations, the specialized policy items may also contain a history of all revocation certificates issued for a collection. An attacker that subverts a replica of a distributed system can always isolate and subvert the subset of that system that depends on and trusts only that replica for updates. Therefore, the present system may use multiple paths for revocation propagation (actually propagation of the specialized policy item).

A special problem arises when certificates are revoked. Assume for example that replica R2 becomes compromised and it becomes necessary to revoke certificates (ii) and (viii). In the presence of such revocations, any items whose validity depended on (ii) or (viii) become invalid. Hence, it might be useful in some cases to create a new replica R2' that can speak for some set of the items that R2 authored before it was compromised. With the participation of C, it is possible to issue (ii') and (viii') that grant authority to R2'. However, these new certificates should be distributed at the same time as the revocations on R2, because if all the above policy changes are not accepted atomically, there could arise inconsistent, intermediate states leading to inappropriate invalidation of items.

In practice, it is not necessary for each item to contain an ACL specification. Instead, the namespace of items can be used to define default ACLs for items that populate specific parts of the namespace. For example, system policy can say:

C says ModifierReps=>[myitems]C (xii)

C says SyncReps=>[myitems/*/Read( )]C (xiii)

This policy would allow any replica in ModifierReps to create items, modify ACLs, or perform operations in the myitems namespace. In this case, only a content signature would be required to prove item validity. In embodiments, the ACLs in this example cannot be diminished, even for new objects. The policy statements (xii) or (xiii) can be revoked, but this affects all items under myitems.

Other default policies can be created that give more constrained control on items, for example:

C says PrivilegedReps=>[myitems]C (xiv)

C says ModifierReps=>[myitems/*/SetContents(*)]C (xv)

C says SyncReps=>[myitems/*/Read( )]C (xvi)

This policy yields a default policy for myitems that is equivalent to the per-item policy defined above. However, per-item certificates of the form of (1), (2), and (3) above are not required. The difference is even a newly-created item cannot possess an ACL that allows for fewer members than the default (barring revocations). Unlike (xii) and (xiii) above, members of ModifierReps that are not PrivilegedReps cannot write an ACL on Read( ) or SetContents( ) that extends the default.

Figure 6:
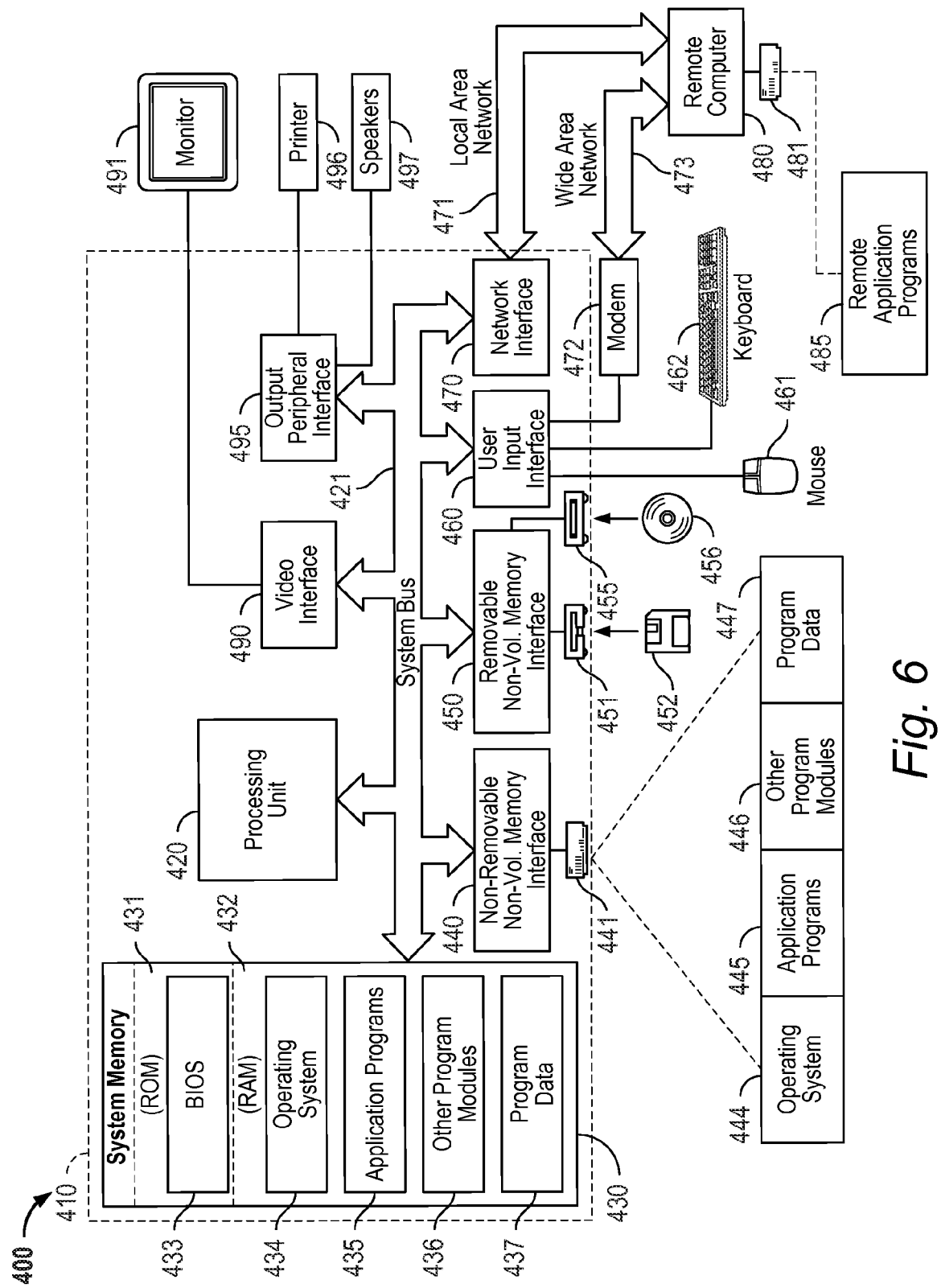
FIG. 6 is a block diagram of a computing system environment according to an embodiment of the present system.

FIG. 6 illustrates an example of a suitable general computing system environment 400 for implementing a replica, archival replica and/or collection manager. It is understood that the term "computer" as used herein broadly applies to any digital or computing device or system. The computing system environment 400 is only one example of a suitable computing environment and is not intended to suggest any limitation as to the scope of use or functionality of the inventive system. Neither should the computing system environment 400 be interpreted as having any dependency or requirement relating to any one or combination of components illustrated in the exemplary computing system environment 400.

The inventive system is operational with numerous other general purpose or special purpose computing systems, environments or configurations. Examples of well known computing systems, environments and/or configurations that may be suitable for use with the inventive system include, but are not limited to, personal computers, server computers, multiprocessor systems, microprocessor-based systems, set top boxes, programmable consumer electronics, network PCs, minicomputers, mainframe computers, laptop and palm computers, hand held devices, distributed computing environments that include any of the above systems or devices, and the like.

With reference to FIG. 6, an exemplary system for implementing the inventive system includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 may include a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes volatile and nonvolatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 430 includes computer storage media in the form of volatile and/or nonvolatile memory such as ROM 431 and RAM 432. A basic input/output system (BIOS) 433, containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 6 illustrates operating system 434, application programs 435, other program modules 436, and program data 437.

The computer 410 may also include other removable/non-removable, volatile/nonvolatile computer storage media. By way of example only, FIG. 6 illustrates a hard disc drive 441 that reads from or writes to non-removable, nonvolatile magnetic media and a magnetic disc drive 451 that reads from or writes to a removable, nonvolatile magnetic disc 452. Computer 410 may further include an optical media reading device 455 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 441 is typically connected to the system bus 421 through a non-removable memory interface such as interface 440. Magnetic disc drive 451 and optical media reading device 455 are typically connected to the system bus 421 by a removable memory interface, such as interface 450.

The drives and their associated computer storage media discussed above and illustrated in FIG. 6, provide storage of computer readable instructions, data structures, program modules and other data for the computer 410. In FIG. 6, for example, hard disc drive 441 is illustrated as storing operating system 444, application programs 445, other program modules 446, and program data 447. These components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and a pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 6. The logical connections depicted in FIG. 6 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communication over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 6 illustrates remote application programs 485 as residing on memory device 481. It will be appreciated that the network connections shown are exemplary and other means of establishing a communication link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. A computer-readable storage medium not consisting of a modulated data signal for programming a processor to perform a method of implementing an access control policy on a weakly-coherent distributed collection, the method comprising the steps of:
   (a) generating one or more certificates creating one or more access control rights with respect to one or more replicas and items in the weakly-coherent distributed collection, said step (a) of generating one or more certificates including the step of creating one or more namespaces to subdivide the rights associated with different replicas;
   (b) revoking a certificate of the one or more certificates by a collection manager and/or one or more replicas granted authority to revoke the one or more certificates;
   (c) preventing conflicting policies within the weakly-coherent distributed collection by preventing modification of the one or more certificates by the collection manager and one or more replicas granted authority to revoke the one or more certificates; and
   (d) creating a new replica upon revocation of the certificate in said step (b), and recreating the certificate revoked in said step (b) in the new replica, the new replica implementing policy to replace the policy of the revoked certificate.

2. A computer-readable storage medium as recited in claim 1, wherein said step (a) of generating one or more certificates creating one or more access control rights comprises the step of generating one or more equivalence classes of replicas, each class of the one or more equivalence classes having a different authority.

3. A computer-readable storage medium as recited in claim 2, wherein said step of generating one or more equivalence classes of replicas comprises the step of generating a class of privileged replicas having the authority to define access control policy for one or more replicas and items.

4. A computer-readable storage medium as recited in claim 2, wherein said step of generating one or more equivalence classes of replicas comprises the step of generating a class of modifier replicas having the authority to update versions of items.

5. A computer-readable storage medium as recited in claim 4, wherein the class of modifier replicas do not have authority to define access control policy for replicas or items.

6. A computer-readable storage medium as recited in claim 2, wherein said step of generating one or more equivalence classes of replicas comprises the step of generating a class of synchronization replicas having the authority to synchronize with other replicas.

7. A computer-readable storage medium as recited in claim 6, wherein the class of synchronization replicas do not have authority to update versions of items and do not have the authority to define access control policy for replicas or items.

8. A computer-readable storage medium as recited in claim 1, wherein said step (a) of generating one or more certificates creating one or more access control rights comprises the step of generating one or more items and assigning responsibility for setting policy for the one or more items to the collection manager or replica creating the item.

9. A computer-readable storage medium as recited in claim 8, wherein said step (a) of generating one or more certificates creating one or more access control rights comprises the step of defining one or more operations which may be performed on the one or more items.

10. A computer-readable storage medium as recited in claim 9, wherein said step (a) of generating one or more operations which may be performed on the one or more items comprises the step of generating at least one of a right to modify the one or more items and a right to read the one or more items.

* * * * *